(12) United States Patent
Takezawa et al.

(10) Patent No.: US 7,618,255 B2
(45) Date of Patent: Nov. 17, 2009

(54) APPARATUS AND METHOD FOR CATALYTIC COMBUSTION

(75) Inventors: Hideyasu Takezawa, Otake (JP);
Tomohiko Mawatari, Iwakuni (JP);
Yasuhiro Kabu, Saeki-gun (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 351 days.

(21) Appl. No.: 10/542,745

(22) PCT Filed: Jan. 20, 2004

(86) PCT No.: PCT/JP2004/000393

§ 371 (c)(1),
(2), (4) Date: Jul. 19, 2005

(87) PCT Pub. No.: WO2004/065851

PCT Pub. Date: Aug. 5, 2004

(65) Prior Publication Data

US 2006/0063117 A1   Mar. 23, 2006

(30) Foreign Application Priority Data

Jan. 21, 2003   (JP) .............................. 2003-012105

(51) Int. Cl.
*F23D 3/40* (2006.01)
(52) U.S. Cl. .............................. 431/7; 431/10; 431/170; 110/341; 110/342; 422/188; 422/189; 422/211; 422/198; 60/276; 60/282; 60/302; 60/272; 60/304; 60/39.5

(58) Field of Classification Search .................. 431/70, 431/7, 10, 170; 310/56; 435/266; 126/116 A; 48/127.9, 61, 128, 198.7; 422/188, 189, 422/211, 198; 110/341, 342, 203, 345; 518/726; 60/276, 282, 302, 272, 304, 39.5
See application file for complete search history.

(56) References Cited

U.S. PATENT DOCUMENTS

| | | | | |
|---|---|---|---|---|
| 3,879,453 A | * | 4/1975 | Ono et al. ................... | 562/547 |
| 4,605,779 A | * | 8/1986 | Matsuda et al. ............. | 568/450 |
| 4,656,831 A | * | 4/1987 | Budininkas et al. ........... | 60/297 |
| 5,199,961 A | * | 4/1993 | Ohsaki et al. .................. | 48/94 |
| 5,397,549 A | * | 3/1995 | Newman ..................... | 423/235 |
| 6,210,454 B1 | * | 4/2001 | Viltard et al. ............... | 48/127.9 |
| 2004/0068933 A1 | * | 4/2004 | Nakamura et al. .......... | 48/127.9 |

FOREIGN PATENT DOCUMENTS

JP   51-106691   9/1976

(Continued)

*Primary Examiner*—Steven B McAllister
*Assistant Examiner*—Avinash Savani
(74) *Attorney, Agent, or Firm*—Oblon, Spivak, McClelland, Maier & Neustadt, L.L.P.

(57) ABSTRACT

A catalytic combustion apparatus is equipped with a reactor for catalytically burning a gas to be treated containing a combustible organic compound, which further comprises a condensate forming means for condensing a part of a gas after reaction in the reactor, to form a condensate, and a pH measuring means for measuring a pH of the resultant condensate. It is preferred that the catalytic combustion apparatus still further comprise a temperature adjusting means for adjusting a temperature of at least a catalyst-packed portion of the reactor based on data measured by the pH measuring means.

12 Claims, 1 Drawing Sheet

FOREIGN PATENT DOCUMENTS

| | | |
|---|---|---|
| JP | 55-99517 | 7/1980 |
| JP | 5-317844 | 12/1993 |
| JP | 7-118198 | 5/1995 |
| JP | 07295159 A * | 11/1995 |
| JP | 11-304132 | 11/1999 |
| JP | 2000-033266 | 2/2000 |

* cited by examiner

APPARATUS AND METHOD FOR CATALYTIC COMBUSTION

TECHNICAL FIELD

The present invention relates to a catalytic combustion apparatus and a catalytic combustion method for treating by catalytically burning a gas to be treated containing a combustible organic compound.

BACKGROUND ART

An exhaust gas exhausted from a chemical plant may contain one or more combustible organic compounds such as saturated hydrocarbons, unsaturated hydrocarbons, organic acids, esters, and alcohols. In view of environmental concerns, it is not preferred to diffuse combustible organic compounds into the air, and therefore, it is necessary that the exhaust gas be purified before it is exhausted out of the chemical plant.

A treatment using a catalytic combustion reaction is proposed as one treatment for purifying a gas to be treated containing a combustible organic compound and exhausting the purified gas out of the chemical plant. It is known that platinum group metal-supported catalysts such as platinum and palladium exhibit high activity as catalysts for combustion treatment. For example, Japanese Unexamined Patent Application, First Publication No. 51-106691 discloses that a catalyst in which platinum and palladium are supported on an alumina carrier is effectively used as a catalyst for purifying an exhaust gas. Furthermore, Japanese Unexamined Patent Application, First Publication No. 2000-33266 discloses that a tin oxide on which palladium, or palladium and platinum are supported is effectively used as a catalyst for purifying an exhaust gas.

However, it is known that catalytic activity of the platinum group metal-supported catalysts gradually decreases due to catalytic poisoning, that is, adhesion of a catalytic poison to an active site of the catalysts, or heat deterioration by sintering or the like. When the catalytic activity is decreased, a method of raising the reaction temperature to maintain purifying capacity is usually adopted.

The amount of the combustible organic compound can be sufficiently reduced by raising the reaction temperature even if the catalytic activity is decreased; but on the other hand, the temperature increase accelerates heat degradation of the catalyst, and then the catalyst life may decrease. If the reaction continues using the degraded catalyst, the amount of the combustible organic compound is not efficiently reduced, and then, gas still comprising the combustible organic compound may be exhausted into the air. In a worst case scenario, the plant inevitably must be stopped, and then an owner of the plant sustains great damage. Therefore, in order to extend the catalyst life, the catalytic combustion reaction is preferably carried out at the lowest reaction temperature at which the amount of the combustible organic compound can be sufficiently reduced.

As a method for ascertaining whether the combustible organic compound has been sufficiently reduced, a gas after reaction may be analyzed by gas chromatography. Gas chromatography can be used to ascertain whether the combustible organic compound has been sufficiently reduced; however, it is not suitable for optimization of the reaction temperature.

For example, if the reaction temperature is changed and gas analysis is carried out after the reaction at each reaction temperature, it is theoretically possible to optimize the reaction temperature by determining the lowest reaction temperature which can sufficiently reduce the amount of the combustible organic compound with the catalytic performance available at the time. However, it requires much labor to optimize a reaction temperature by analyzing in detail by gas chromatography whenever the reaction conditions of the catalytic activity are changed, and it is far from realistic.

DISCLOSURE OF INVENTION

In view of the aforementioned problems, an object of the present invention is a provision of a catalytic combustion apparatus and a catalytic combustion method which make it possible to constantly treat a gas to be treated at the optimized reaction temperature at which long life of a catalyst is preserved while the gas to be treated is sufficiently purified by simply monitoring a condition of the purified gas to be treated containing a combustible organic compound.

To solve the problems described above, the present inventors have intensively researched and have found that there is a correlation between a pH value of a condensate of a gas after reaction and a rate of purification of the combustible organic compound. The present inventors have focused on this point, and then have completed the invention of a catalytic combustion apparatus and a catalytic combustion method as follows.

A first aspect of the present invention is a catalytic combustion apparatus comprising a reactor for catalytically burning a gas to be treated containing a combustible organic compound, and further comprising a condensate forming means for condensing a part of a gas after reaction in the reactor and forming a condensate, and a pH measuring means for measuring a pH of the condensate.

It is preferred that the catalytic combustion apparatus according to the present invention further comprises a temperature adjusting means for adjusting a temperature of at least a catalyst-packed portion of the reactor based on data measured by the pH measuring means.

The catalytic combustion apparatus according to the present invention is preferably used for treatment of the gas to be treated comprising organic acids such as acetic acid and methacrylic acid as combustible organic compounds. As the gas to be treated, for example, exhaust gases generated when methacrolein or methacrylic acid is produced by vapor-phase oxidation of isobutylene or tertiary butyl alcohol, are exemplary.

A second aspect of the present invention is a catalytic combustion method for a gas to be treated containing a combustible organic compound, comprising the steps of generating a condensate by condensing a part of a gas after catalytic combustion, and adjusting a catalytic combustion temperature of the gas to be treated based on a pH of the condensate.

BEST MODE FOR CARRYING OUT THE INVENTION

Figure 1:
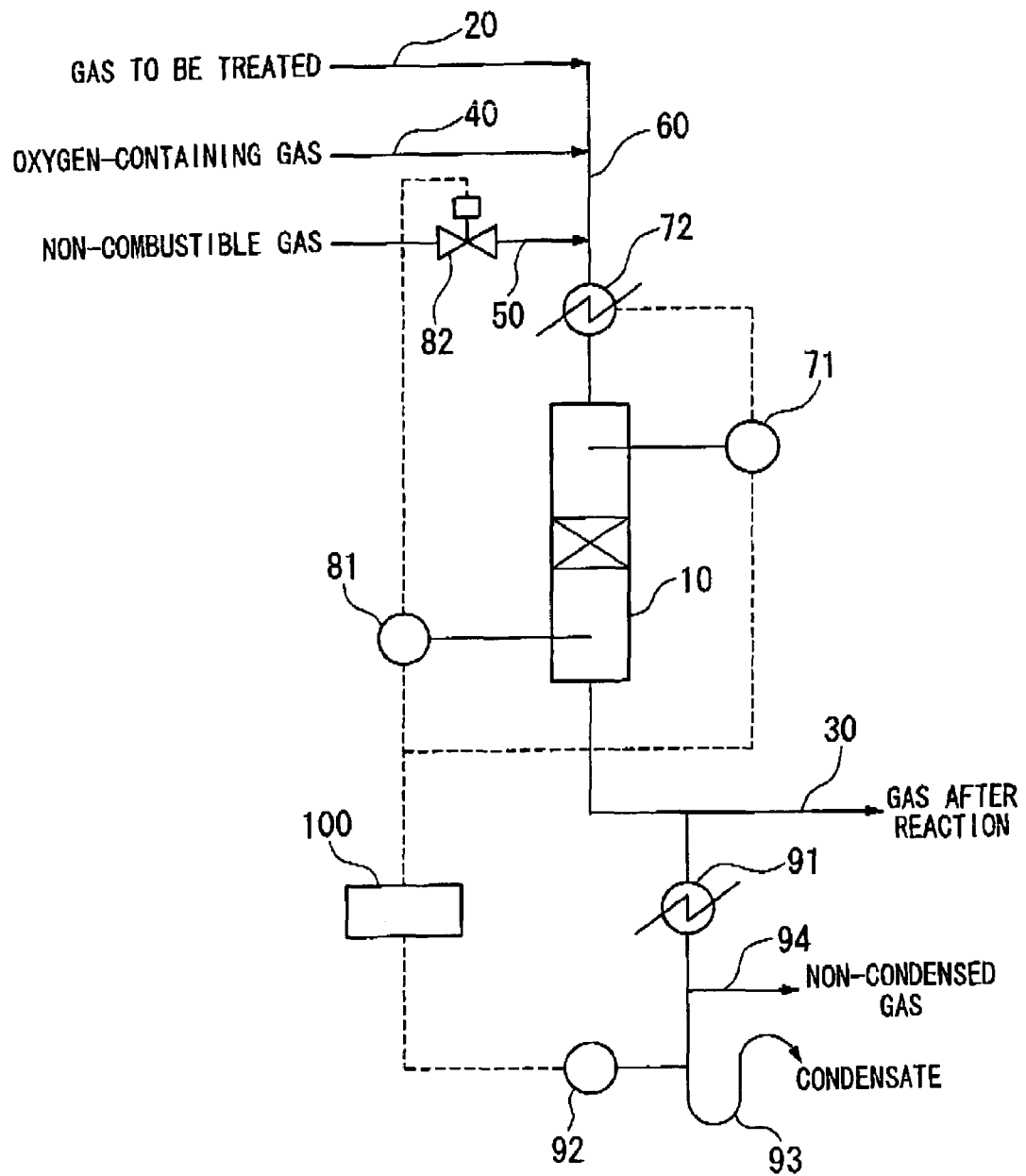
FIG. 1 is a diagram showing a catalytic combustion apparatus of an embodiment according to the present invention.

An example of a structure of a catalytic combustion apparatus of an embodiment according to the present invention is explained with reference to FIG. 1.

The catalytic combustion apparatus of this embodiment is mainly composed of a reactor 10. The reactor 10 is connected to a gas to be treated supply pipe 20 through which a gas to be treated containing a combustible organic compound is supplied, wherein the gas to be treated supplied through the gas to be treated supply pipe 20 is catalytically burned. In the reactor 10, a catalyst-packed portion (not shown) in which a catalyst is provided, for example, in layers, is provided in a flow path of the gas to be treated, and a gas after reaction discharge pipe 30 discharging a gas after reaction is connected to a downstream side of the catalyst-packed portion.

The catalyst to be packed in the reactor 10 is not specially limited, and, for example, platinum group metal-supported catalysts such as platinum and palladium are preferably used.

Furthermore, an oxygen-containing gas supply pipe 40 supplying oxygen-containing gas and a non-combustible gas supply pipe 50 supplying non-combustible gas are connected to the reactor 10. Furthermore, the gas to be treated supply pipe 20, the oxygen-containing gas supply pipe 40, and the non-combustible gas supply pipe 50 are connected to each other via a common pipe arrangement 60. Accordingly, the gas to be treated, the oxygen-containing gas, and the non-combustible gas are mixed and the mixture is supplied into the reactor 10.

The common pipe arrangement 60 comprises a heater 72 such as a heat exchanger for heating gas which runs through the common pipe arrangement 60. Furthermore, the reactor 10 comprises a temperature controller 71 such as a TIC, which detects its inlet temperature and controls the heater 72 according to the detected temperature.

The oxygen-containing gas is used in order to supply required oxygen to completely effect combustion of the combustible organic compound, and a specific example thereof includes air. The feed rate of the oxygen-containing gas is suitably determined according to the amount of the combustible organic compound in the gas to be treated, and particularly, it is preferred that oxygen concentrate in the gas after reaction is adjusted to be between 0.5 to 10%. The noncombustible gas is used in order to adjust temperature of the inside of the reactor 10, and specific examples thereof include nitrogen, water vapor, carbon dioxide, and a mixed gas thereof. Particularly, the gas after reaction (after purification of the combustible organic compound) is preferably used as the non-combustible gas. The noncombustible gas supply pipe 50 comprises a flow rate controlling valve 82 for controlling a flow rate of a gas which runs through the non-combustible gas supply pipe 50. Furthermore, the reactor 10 comprises a temperature controller 81 such as a TIC, which detects its inlet temperature and controls the flow rate controlling valve 82 according to the detected temperature.

The inlet and outlet temperatures are suitably determined according to kinds of the gas to be treated, kinds of catalysts, catalytic activity, and the like, and, for example, when a platinum group metal-sported catalyst is used, it is preferred that the inlet temperature is set to about 200° to 400° C. and the outlet temperature is set to about 450° to 700° C.

In this embodiment, the catalytic combustion apparatus comprises a condenser (condensate forming means) 91 for forming a condensate by condensing a part of a gas after reaction (a gas after catalytic combustion), and comprises a pH meter 92 (pH measuring means) for measuring a pH of a resultant condensate, which is connected to the condenser 91. To adopt this composition is distinctive of the present invention. Furthermore, a condensate pipe 93 through which the condensate runs and a non-condensable gas pipe 94 through which the non-condensable gas, which was not condensed by the condenser 91, runs are connected to a downstream side of condenser 91.

Specific examples of the condenser 91 include a heat exchanger in which the gas after reaction is condensed by cooling. The amount of gas introduced into the condenser 91 is not limited, as long as it is sufficient for measuring a pH of the condensate to be formed, and to make the condensate afresh. Furthermore, a cooling temperature of the gas after reaction in the condenser 91 is suitably determined by a concentration of water contained in the gas after reaction or the like, and is not specially limited. Usually, the cooling temperature is set to 50° C. or less, preferably 30° C. or less. As the pH meter 92, an electrode pH meter can be used.

Furthermore, in this embodiment, the catalytic combustion apparatus comprises a controller 100 for controlling the temperature controllers 71 and 81 based on data measured by the pH meter 92. Accordingly, the heater 72 and the flow rate controlling valve 82 are controlled based on data measured by the pH meter 92, the inlet temperature and outlet temperature of the reactor 10 are controlled, and then, at least the temperature of catalyst-packed portion (catalytic combustion temperature) in the reactor 10 can be controlled. That is, in this embodiment, the temperature controller 71, the temperature controller 81, and the controller 100 function as a temperature adjusting means which adjusts a temperature of at least the catalyst-packed portion of the reactor 10, The gas to be treated is not specially limited as long as it is a gas containing a combustible organic compound, and a specific example includes an exhaust gas generated when methacrolein or methacrylic acid is produced by vapor-phase oxidation of isobutylene or tertiary butyl alcohol.

The above exhaust gas comprises isobutylene, carbon oxide, acetic acid, methacrylic acid, and the like as combustible organic compounds. Among these combustible organic compounds, organic acids such as acetic acid and methacrylic acid exhibit more incombustibility than the other compounds. Using this property in this embodiment, the presence of unburned organic acids in the gas after reaction is detected as a pH value of its condensate, and then, the catalytic combustion temperature (reaction temperature) is adjusted.

A catalytic combustion method using the catalytic combustion apparatus of this embodiment is explained in detail as follows.

In this embodiment, it is necessary to determine a relationship of a rate of purification of the combustible organic compound and a pH value of the condensate of the gas after reaction beforehand. The relationship of the rate of purification of the combustible organic compound and the pH value of the condensate of the gas after reaction can be determined, for example, by carrying out gas analysis after reaction using gas chromatography together with pH measurement of the condensate of the gas after reaction. Then, the pH value of the condensate, which is a minimum value for sufficiently reducing the amount of the combustible organic compound, is obtained based on the obtained relationship. Hereinafter, this pH value is referred to as the "reference value". Furthermore, the reference value changes in response to a composition of the gas to be treated, the amount of gas to be treated, a kind of catalyst, and the like. Moreover, the rate of purification is calculated by the following expression for each combustible organic compound.

Rate of purification (%)=(1−[Concentration of combustible organic compound in gas after reaction]/[Concentration of combustible organic compound in gas to be treated])×100

In this embodiment, based on the data measured by the pH meter 92, the temperature controllers 71 and 81 are controlled via the controller 100, the inlet temperature and outlet temperature of the reactor 10 are adjusted, and at least the temperature of the catalyst-packed portion (catalytic combustion temperature) of the reactor 10 is adjusted. That is, when the pH value of the condensate is below the reference value, it means the presence of unburned organic acids in the gas after reaction and insufficient purification of the gas to be treated. In this case, the catalytic combustion temperature is raised for improving a capacity of purification. On the contrary, when the pH value of the condensate is over the reference value, it means that the catalyst is being heated more than necessary. In this case, the catalytic combustion temperature is lowered to within no less than a temperature corresponding to the reference value.

Furthermore, the temperature controllers 71 and 81 may be manually controlled instead of automatically controlled. However, it is matter of course that automatic control can make operation simple.

In addition, a frequency of the pH measurement of the condensate is not limited, but, preferably, the pH of the condensate is continuously measured and monitoring is constantly carried out.

According to the catalytic combustion apparatus and the catalytic combustion method of the present embodiment, purification conditions can be easily monitored based on the pH value of the condensate. Therefore, if the amount of the combustible organic compound is not being sufficiently reduced due to, for example, degradation of catalytic activity, this condition is immediately detected, and an operation for improving the purification treatment capacity by increasing the catalytic combustion temperature can be carried out. Then, exhaustion of the combustible organic compound in an amount not sufficiently reduced out of the catalytic combustion system can be immediately prevented.

Furthermore, since the catalytic combustion temperature is adjusted using the minimum pH value for sufficiently reducing the combustible organic compound as a reference, there is no risk that the catalyst is heated more than necessary, and heat degradation of the catalyst is suppressed so that catalyst life can be extended.

As described above, according to the present embodiment, treatment of the combustible organic compound can be constantly carried out at an optimum reaction temperature at which the amount of the combustible organic compound can be sufficiently reduced while long life of the catalyst can be ensured.

Moreover, especially, the present embodiment is favorably used for the treatment of a gas to be treated containing organic acids such as acetic acid and methacrylic acid as the combustible organic compound, and further, the present embodiment can be applied to a gas to be treated containing no organic acid as long as the gas contains a combustible organic compound in which a pH of a condensate thereof differs before and after purification. Particularly, it is favorably used for a combustible organic compound wherein an organic acid is formed as an intermediate during a burning reaction.

EXAMPLE

Next, an example according to the present invention and a comparative example will be described as follows.

Using the catalytic combustion apparatus of the above-described embodiment, catalytic combustion treatment of a gas to be treated containing combustible organic compounds was continuously carried out.

From the gas to be treated supply pipe, exhaust gas generated when methacrolein was produced by vapor-phase oxidation of isobutylene was continuously supplied. When a composition of the used exhaust gas was analyzed, there was 72.9% of nitrogen, 5.5% of oxygen, 15.6% of water, 1.8% of carbon oxide, 2.7% of carbon dioxide, 2500 ppm of isobutylene, 2000 ppm of acetic acid, and 200 ppm of methacrylic acid.

From the oxygen-containing gas supply pipe, air of a quantity so that the oxygen concentration of the outlet gas of the reactor was 4.0% was continuously supplied. From the non-combustible gas supply pipe, the gas after reaction (after purification of the combustible organic compound) was continuously supplied A catalytic combustion apparatus was operated in which a platinum-supported alumina carrier was used as a combustion catalyst for filling the reactor, under the condition that SV (space velocity) was set to 20000 Gas-NL/Cat-L.

Operation of the catalytic combustion apparatus was started at a 240° C. inlet temperature of the reactor and a 540° C. outlet temperature of the reactor, and then, the gas after reaction and the condensate after three hours from the operation start were sampled, and these samples were analyzed by gas chromatography. As a result, the rate of purification of isobutylene was 100%, the rate of purification of acetic acid was 99.7%, and the rate of purification of methacrylic acid was 99.9%. The pH value of the condensate at this time was 4.6.

The reference value of the pH value of the condensate was determined after two days from the operation start. That is, the inlet temperature of the reactor was lowered to 235° C., 230° C., and then 228° C. and the gas after reaction and the condensate at each temperature were analyzed by gas chromatography, and a pH value of each condensate was recorded.

With the inlet temperature of the reactor at 235° C., the rate of purification of isobutylene was 100%, the rate of purification of acetic acid was 99.5%, the rate of purification of methacrylic acid was 99.9%, and the pH value of the condensate was 4.5; at 230° C., the rate of purification of isobutylene was 100%, the rate of purification of acetic acid was 99.1%, the rate of purification of methacrylic acid was 99.6%, and the pH value of the condensate was 4.3; and at 228° C., the rate of purification of isobutylene was 100%, the rate of purification of acetic acid was 98.2%, the rate of purification of methacrylic acid was 99.3%, and the pH value of the condensate was 4.0.

When a target of the rate of purification was made 99.5% of rates of purification of each combustible organic compound, if the pH value of the condensate was 4.5 or more according to the relationship of the pH of condensate and the rate of purification, it was found that the combustible organic compound was sufficiently purified. Therefore, the reference value of the pH value of the condensate was set to 4.5. Then, pH values of the condensate were continuously measured, and if the pH value was lower than the reference value, the inlet and outlet temperatures were increased, and the temperature of the catalyst-packed portion was raised by 1° C.

Thus, an operating standard was defined, and continuous operation was carried out for six months. As a result of analysis of the gas after reaction by gas chromatography at a frequency of once a week, the rate of purification of isobutylene was 100%. Furthermore, the lowest value of the rate of purification of acetic acid was 99.5%, and the lowest value of the rate of purification of methacrylic acid was 99.7%. The inlet and outlet temperatures of the reactor of six months later were 260° C. and 565° C. respectively.

COMPARATIVE EXAMPLE

A catalytic combustion treatment of a gas to be treated was carried out under the sane conditions as in the Example, except that the pH measurement of the condensate of the gas after reaction was not carried out. In addition, the result of analysis of the gas after reaction by gas chromatography which was carried out once a week was reflected on a temperature adjustment of the catalyst-packed portion. That is, when isobutylene was detected by gas chromatography analysis, the temperature of the catalyst-packed portion was raised until isobutylene gas was no longer detected in the gas after reaction.

According to such an operating standard, continuous operation was carried out for six months. When the gas after reaction was analyzed by gas chromatography, the lowest value of the rate of purification of isobutylene was 99.8%, the lowest value of the rate of purification of acetic acid was 98.1%, and the lowest value of the rate of purification of methacrylic acid was 99.0%. The inlet and outlet temperatures of the reactor six months later were 270° C. and 575° C. respectively. The catalyst-packed portion was heated to about 10° C. higher than the catalyst-packed portion of Example.

In view of the results of Example and Comparative Example, it was found that a combustible organic compound can be purified satisfactory and stably without heating catalysts more than necessary by adjusting the temperature of the catalyst-packed portion of a reactor (catalytic combustion temperature) according to pH data of condensate of a gas after reaction.

INDUSTRIAL APPLICABILITY

According to the catalytic combustion apparatus of the present invention, since the catalytic combustion apparatus equipped with a reactor for catalytically burning a gas to be treated containing a combustible organic compound comprises a condensate forming means for condensing a part of the gas after the reaction in the reactor, and a pH measuring means for measuring a pH of the resultant condensate, a purified condition of the combustible organic compound is simply monitored and treatment of the combustible organic compound is constantly carried out at an optimum reaction temperature at which the combustible organic compound is sufficiently purified while long life of the catalyst can be ensured.

The invention claimed is:

1. A catalytic combustion apparatus, comprising:
a catalytic oxidizing reactor having a gas treatment inlet for a gas to be treated, an oxygen gas inlet for an oxygen-containing gas, and a non-combustible gas inlet for a non-combustible gas, and an oxidized gas outlet for an oxidized gas; a heater for heating one or more of the gas to be treated, the oxygen-containing gas and the non-combustible gas; wherein the catalytic oxidizing reactor comprises a catalyst bed for oxidizing the gas to be treated;
a condenser having an inlet connected to the oxidized gas outlet of the oxidizing reactor, and an outlet for a condensate; and
a pH meter for measuring a pH of the condensate;
wherein the pH meter is related to a temperature controller for controlling the temperature of the heater; wherein the temperature controller changes the temperature of the heater in response to the pH of the condensate measured by the pH meter.

2. The catalytic combustion apparatus according to claim 1, comprising a temperature controller connected to the catalytic oxidizing reactor and the pH meter.

3. The catalytic combustion apparatus according to claim 1, wherein the gas to be treated is a gaseous composition comprising an organic acid, and the catalyst bed oxidizes the gaseous composition comprising the organic acid.

4. The catalytic combustion apparatus according to claim 3, wherein the gaseous composition comprises at least one selected from the group consisting of acetic acid and methacrylic acid.

5. The catalytic combustion apparatus according to claim 4, wherein the gaseous composition is obtained from a vapor phase oxidation process for making methacrolein or methacrylic acid from isobutylene or tertiary butyl alcohol.

6. The catalytic combustion apparatus according to claim 1, wherein the catalyst bed comprises a platinum group metal-supported catalyst.

7. The catalytic combustion apparatus according to claim 1, further comprising:
a controller to adjust the oxygen concentration in the oxidized gas to 0.5-10%.

8. The catalytic combustion apparatus according to claim 1, further comprising:
a temperature controller to control the temperature of the catalytic oxidizing reactor, wherein the temperature controller is connected to the pH meter and the temperature controller controls the temperature of the catalytic oxidizing reactor based on the pH of the condensate.

9. A catalytic combustion method for oxidizing a gaseous composition comprising a combustible organic compound, comprising:
treating the gaseous composition with a catalytic oxidizing reactor comprising a heater for heating the gaseous composition and a catalyst bed, to form a gaseous combustion product;
condensing at least a portion of the gaseous combustion product in a condenser connected to the oxidizing reactor;
to form a liquid condensate;
measuring a pH of the liquid condensate with a pH meter related to a temperature controller for controlling the temperature of the heater; and
adjusting the temperature at which the gaseous composition is treated with the catalytic oxidizing reactor according to the pH of the liquid condensate; wherein the temperature controller changes the temperature of the heater in response to the pH of the condensate measured by the pH meter.

10. The method according to claim 9 wherein the gaseous composition comprises an organic acid and the catalyst bed comprises a platinum group metal-supported catalyst.

11. The catalytic combustion apparatus according to claim 1, wherein the oxidized gas outlet is in fluid connection with the non-combustible gas inlet.

12. The method according to claim 9, further comprising:
adjusting the oxygen concentration in the gaseous combustion product to from 0.5 to 10%.

* * * * *